2,923,658

FUNGICIDAL COMPOSITIONS AND METHODS EMPLOYING p-CHLORO-ω-THIOCYANO ACETYL BENZENE

Erik Regel, Koln-Klettenberg, Richard Wegler, Leverkusen, and Ferdinand Grewe, Koln-Stammheim, Germany, assignors to Farbenfabriken Bayer Aktiengesellschaft, Leverkusen, Germany, a corporation of Germany No Drawing. Application January 14, 1958
Serial No. 708,739

Claims priority, application Germany January 29, 1957

4 Claims. (Cl. 167—30)

The present invention relates to and has as its objects fungicidal compositions and a method of combating fungi or protecting plants against fungi attack which comprises treating the plants infested or to be protected with p-chloro-ω-thiocyano acetyl benzene of the following formula

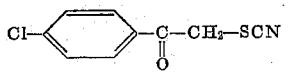

or with compositions containing this compound as an active ingredient.

The protection of plants from attacks by noxious fungi is of great economic importance. However, the number of fungicides which are practically useful for this purpose in spite of great efforts, is still comparatively small. Almost all fungicides have partial defects in that they are either not sufficiently plant-compatible at higher concentrations or not sufficiently resistant to weather conditions such as intensive sun irradiation or prolonged damp weather, particularly at elevated temperatures. Other fungicides are only specifically active, thus necessitating a completion by or combination with further fungicides.

A new extraordinarily active leaf fungicide has now been found which possesses a broad and strong action, on the one hand, and is sufficiently stable in a weakly alkaline as well as a weakly acid medium, on the other hand, without injuring the plants when applied in the quantities necessary for obtaining the fungicidal effect. Such a compound is provided by p-chloro-ω-thiocyano-acetyl-benzene of the above shown formula. This compound is obtainable by methods known in principle, for example by reacting p-chloro-ω-chloroacetophenone with a thiocyanate as described in German specification No. 553,856.

Some aromatic thiocyanates having a fungicidal action are already known, for example dinitrothiocyanobenzene, but the compounds of this type exhibit only a limited compatibility with many plants, on the one hand, while falling far below the aforesaid compound with regard to the extent of their activity, on the other hand. It has moreover been found that a very great number of thiocyanates of various types comprising also numerous derivatives of ω-thiocyanoacetyl benzene have only an unsatisfactory fungicidal activity or none at all, and that the high activity which is particularly important for practical application remains practically limited to p-chloro-ω-thiocyano-acetophenone.

The compounds of the present invention are preferably applied to plants by means of spraying. Spraying of the plants to be treated is preferably performed with aqueous emulsions or suspensions of the active ingredients. Aqueous emulsions or suspensions containing from about 0.01% to about 1% by weight and preferably from about 0.05% to about 0.5% by weight of the active ingredient are practically suitable. If spraying is effected with much smaller quantities of liquid as in low volume spraying higher concentrations of the active ingredients should be employed. If desired a certain amount of a wetting agent can be added to form a suspension of the active ingredient. Any of the conventional wetting agents such as those of anionic, cationic or nonionic type can be employed. Practically suitable, however, are such wetting agents which are of nonionic type, for instance a polyglycol ether of a benzyl hydroxy diphenyl which may contain from about 12 to 15 glycol radicals. But also other polyethylene glycol ethers of generally alkylated phenols are of same advantage to bring the compounds of the present invention in the form of a suitable emulsion. Preferably concentrated compositions composing the active ingredient of the present invention and a suitable wetting agent are prepared at first, sometimes also by means of a suitable trisolvent such as the dimethyl formamide or acetone. This concentrate then is dispersed in water just prior to use.

A further form in which fungicidal compounds of the present invention may be applied consists of solutions of the active ingredients in other suitable inert liquid or some solid diluents in which the active ingredient is present preferably in molecularly dispersed form. The form in which the agents to be employed are applied to the object treated depends largely on the nature of the object and the purpose of the application.

Suitable inert solvents for the manufacture of liquid preparations should not be readily inflammable, as odorless as possible and without toxic effects on humans and animals when properly used. Neither should they have a corrosive effect on the components of the preparations or the material of the storage containers. Examples of such suitable solvents are for instance high-boiling oils such as oils of vegetable origin, such as castor oil, and lower boiling solvents with a flash point of say about 30° C. such as carbon tetrachloride, ethylene dichloride, ethane tetrachloride, hydrated naphthalene, alkylated naphthalene, solvent naphtha, etc. Mixtures of solvents may of course also be used.

The compounds of the present invention can also be applied to plants in the form of dusts utilizing as the inert vehicle such materials as tricalcium phosphate, precipitated chalk, bentonite, kaolin, kieselguhr, and the like. Also cork powder, wood powder and the like may be used, but in these cases it is advisable to add wetting agents.

The active substances in question may also be used in the form of aerosols. For this purpose the active ingredient must be dissolved or dispersed in a solvent boiling below room temperature at atmospheric pressure.

The invention is illustrated by the following examples which are not to be considered as limiting the specification and claims in any manner.

Example 1

Activity in vivo (spore germination inhibition test on slides).

p-Chloro-ω-thiocyano-acetyl benzene (active ingredient) has been mixed with the same amount of acetone, whereafter 25% by weight referred to active ingredient of benzyl hydroxy diphenyl polyglycol ether containing about between 10 and 15 glycol residues have been added. This premixture has been diluted with water to the concentration indicated in the table below.

Equal parts by volume of the aqueous emulsion of the active ingredient and an aqueous suspension of conidia of *Phytophthora infestans* and *Fusicladium dendriticum* in aqua bidestillata have been prepared and immediately brought on glass slides into wax circles. These slides are put into Petri dishes and stirred for 24 hours in humid chambers of about 10° C. for Phytophthora and about 20° C. for Fusicladium.

Evaluation occurred after 24 hours by counting the non germinated conidia under the microscope. Complete inhibition has been numbered 100. As comparative compound a commercially handled compound has been used. The results are to be seen from the following table:

|  | Phytophthora infestans | | Fusicladium dendriticum | |
|---|---|---|---|---|
|  | 0.0005% | 0.0001% | 0.0005% | 0.0001% |
| p-chloro-ω-thio-cyano-acetyl benzene | 100 | 100 | 100 | 100 |
| (N-trichloro-methyl-thio-tetrahydro-phthalimide) | 100 | 93.5 | 100 | 61.0 |
| blind test | 0.9 | 0.9 | 3.7 | 3.7 |

*Example 2*

Activity in vivo. Tomato plants (Bonny Best) of about 6 inches height, planted in pots of about 4 inches diameter in standard soil in the green house, are spread to the run off with suspensions which have been prepared as shown before.

The pots are placed for 24 hours at temperatures to 24° C. in an atmosphere of a humidity of 60 to 70% to allow the spray to dry. After that the plants are inoculated with suspensions of Phytophthora infestans in aqua bidestillata and placed in humid chambers at a temperature of about 18° C., the plants are randomized. Humidity in the humid chambers is 100% for 48 hours, and is not allowed to be lower than 90% during the next 4 days. In toto after 6 days after inoculation the results are evaluated. Each pinna of the leaves of the plant has been evaluated by numbers 0 to 4; 0 means no damage, 4 means pinna completely destroyed, 1, 2 and 3 are intermediate values. Each pinna is multiplied with the evaluation number and the total of pinnae then is summarized. The number thus obtained is divided through the number of pinnae. The control number that means the status of the untreated plants has been set 100, and the status of treated plants has been numbered in percent of the aforementioned control value.

As test material for composition there has been used zinc ethylene-bis-dithiocarbamate. From the results it is to be seen that the inventive compound is far more superior:

| preparation | concentrations | |
|---|---|---|
|  | 0.025% | 0.0125% |
| p-choloro-ω-thio-cyano acetyl benzene | 1 | 1 |
| (zinc-ethylene-bis-dithio-carbamate) | 33 | 37 |
| untreated control | 100 | 100 |

In addition to the fungi mentioned in the preceding tables, the inventive compound exhibits also activity against *Plasmopara vitivola* (*peronospora*) on vine, *Septoria apii* on celery, and *Cladosporium fulvum* on tomatoes, which is superior to that of standard fungicides such as zinc ethylene-bis-dithiocarbamate, N-trichloro methylthiotetrahydro phthalimide, tetramethylthiuram-disulphide or copper-oxychloride.

We claim:
1. A method of combating fungi which comprises treating infested plants or plants to be protected with p-chloro-ω-thiocyano-acetyl benzene.
2. Fungicidal compositions consisting of an aqueous emulsion of p-chloro-ω-thiocyano-acetyl benzene.
3. A method of combating fungi which comprises treating infested plants or plants to be protected with an aqueous composition containing 0.01% to 1% by weight of p-chloro-ω-thiocyano-acetyl benzene.
4. Fungicidal compositions consisting of an aqueous emulsion containing 0.01% to 1% by weight of p-chloro-ω-thiocyano-acetyl benzene.

References Cited in the file of this patent

UNITED STATES PATENTS

| 2,024,098 | Heckert | Dec. 10, 1935 |
| 2,239,079 | Coleman | Apr. 22, 1941 |
| 2,426,349 | Gertler | Aug. 26, 1947 |
| 2,790,819 | Godrey | Apr. 30, 1957 |
| 2,819,197 | Santmyer | Jan. 7, 1958 |